Patented Oct. 13, 1953

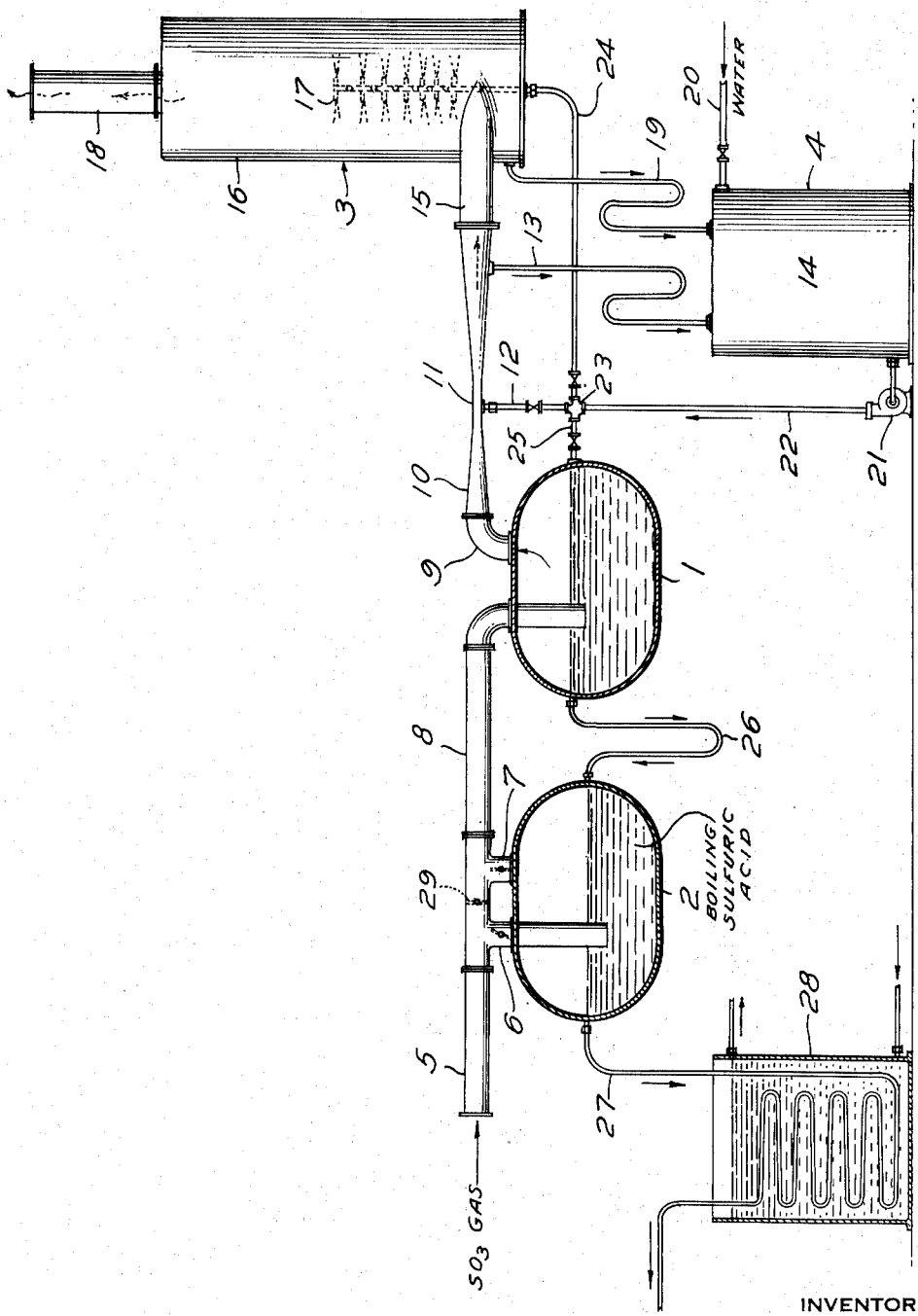

2,655,431

UNITED STATES PATENT OFFICE 2,655,431

SULFURIC ACID PRODUCTION BY ABSORPTION

Louis N. Allen, Jr., Short Hills, N. J., and Thomas P. Forbath, New York, N. Y., assignors to Chemical Construction Corporation, New York, N. Y., a corporation of Delaware Application January 21, 1949, Serial No. 71,988

9 Claims. (Cl. 23—168)

This invention relates to a method and apparatus for the production of sulfuric acid and more particularly to a method of absorbing sulfur trioxide from gases containing this material by contact with sulfuric acid. A principal object of the invention is the provision of a sulfur trioxide absorbing method in which the removal of the heat of absorption is carried out automatically and the use of pipe coolers for cooling the absorbing acid is eliminated.

In the manufacture of sulfuric acid by the contact process a mixture of sulfur dioxide and oxygen-containing gases is passed over a catalyst, preferably of the vanadium type, at temperatures of about 400–500° C. in order to oxidize the sulfur dioxide to sulfur trioxide. In most plants the gases issuing from the converter are then cooled, first by heat exchange with the incoming sulfur dioxide gases and then by air cooling, to temperatures on the order of 50–200° C., the exact temperature depending on the strength of acid to be produced. The sulfur trioxide is absorbed from the cooled gases by contact with sulfuric acid having a strength of between 97 and 99% $H_2SO_4$; usually a 98.5% absorbing acid is employed in order to avoid the formation of a fog or mist of small droplets of sulfuric acid which pass through the absorbers unchanged. A quantity of water chemically equivalent to the amount of sulfur trioxide absorbed from the gases is added to the absorbing acid when sulfuric acid monohydrate is to be produced; smaller or larger quantities of water are introduced when the desired product is oleum or a more dilute sulfuric acid.

Large quantities of heat are generated by the absorption of sulfur trioxide in the absorbing acid, principally by the reaction of the sulfur trioxide with the water contained in the acid to form $H_2SO_4$, and therefore cooling equipment for the absorbing acid has always been provided. Usually the absorbing acid is contacted with the sulfur trioxide gases by passing it downwardly through a packed tower counter to a rising stream of the gas, and the hot acid issuing from the base of the tower has been passed through a set of cooling coils immediately after addition of the diluting water or weak sulfuric acid and before recirculation to the top of the tower.

The acid cooling system usually consists of a series of horizontal cast iron pipes connected by U-bends in a vertical plane, over which water is trickled. In a plant producing 120 tons of sulfuric acid per day as 98% acid about 1400 linear feet of 6-inch cast iron pipe (built up in banks and therefore connected by numerous return bends) are required to cool the absorbing acid to about 75° to 85° C. This represents a substantial portion of the total cost of the plant. The proportion of total cost represented by cooling the absorbing acid is even greater in the case of contact sulfuric acid plants of relatively small size such as those producing up to 50 tons of sulfuric acid per day.

The present invention has for its principal object the provision of a method and apparatus by means of which the sulfuric acid coolers described above are eliminated. Our invention is based on the concept of maintaining the sulfuric acid serving as the absorbing medium in a boiling condition during the absorption process and adding to this acid an excess quantity of water as such or in the form of a more dilute sulfuric acid, over and above that necessary to react with the absorbed sulfur trioxide, to carry away the heat generated by the $SO_3$ absorption as latent heat of vaporization. In other words we introduce into the absorbing acid a quantity of water which, if retained, would form a product acid more dilute than that actually desired and concentrate the diluted acid by boiling it during the absorption, thereby removing both the excess water and the heat of formation of the sulfuric acid manufactured in the plant.

In addition to eliminating the cooling system for the absorbing acid our invention also permits the elimination, if desired, of all of the equipment ordinarily used for cooling the sulfur trioxide gases. However, as is noted above, at least part of the excess heat content of these gases leaving the converter is frequently used to preheat the incoming $SO_2$ gases, and therefore the sulfur trioxide gases may be employed in a partially cooled condition. In most plants using such equipment the sulfur trioxide gases are cooled in the sulfur dioxide heat exchanger only to a temperature somewhat above their dew point, the remainder of the cooling being carried out in air-cooled or water-cooled apparatus of corrosion resistant material, and it is these secondary coolers which are most advantageously eliminated by the process of our invention.

When sulfur trioxide-containing gases are contacted with an absorbing sulfuric acid heated to its boiling point we find that a major proportion of the sulfur trioxide is absorbed, but a minor proportion on the order of about 1–5% is converted into sulfuric acid mist. In accordance with another feature of our invention this mist is agglomerated and condensed, and may be recovered and returned to the absorbing acid in admixture with the diluting water. We have found that the droplets of sulfuric acid mist produced by our high temperature absorption process can be agglomerated and condensed by any one or more of several methods. They may be subjected to the action of an electrostatic field, as in a conventional Cottrell electrostatic precipitator containing a set of vertical tubes having centrally located electrodes in the form of rods or wires. Alternatively, they may be subjected to a high intensity sound field. Another advantageous method consists in passing the sulfuric acid mist-containing gases through a Venturi tube while injecting water or dilute aqueous sulfuric acid into the throat or constricted portion of the venturi, and this system may be followed by a final scrubbing with sprays of water or aqueous sulfuric acid if desired.

A sulfuric acid product of any desired strength from 98% acid to relatively dilute sulfuric acid of 60–70% strength or weaker may be manufactured by the process of our invention. When a product acid having a concentration not greater than 70% $H_2SO_4$ is desired the process can be carried out in a single absorption stage, since only water vapor is evolved when acid up to this strength is boiled. Upon boiling an acid having a concentration between 70% and about 98% $H_2SO_4$ a mixture of water vapor and sulfuric acid vapor is given off. The composition of this vapor varies with the concentration of the acid as is shown, for example, in Fairlie, "Sulfuric Acid Manufacture," page 309. Accordingly, when a product acid having a concentration greater than 70% $H_2SO_4$ is desired the absorption should be carried out in two or more stages, the dilute acid from the last stage or stages being fed back into the preceding stage as diluent for the absorbing acid therein.

The invention will be further described with reference to the accompanying drawing, in which the single figure is a diagrammatic illustration of one form of apparatus suitable for practicing our invention. Referring to this drawing, the apparatus consists of sulfur trioxide absorbers 1 and 2, a sulfuric acid mist absorption system 3 and a dilute sulfuric acid storage and recirculation system 4, together with suitable connecting pipes and valves. In operation, sulfur trioxide-containing gases are introduced through pipe 5 and may pass first by means of a valved dip pipe 6 through the sulfuric acid of 70% to 98% $H_2SO_4$ content in the high-stage absorber 2, wherein most of the sulfur trioxide is absorbed and converted into sulfuric acid. Steam and sulfuric acid vapors resulting from the boiling of the acid in the high-stage absorber together with the sulfuric acid mist and inert gases are passed through outlet pipe 7 and line 8 into the low-stage absorber 1, which functions as a condenser for the sulfuric acid evaporated from the absorber 2.

The acid in the absorber 1 is maintained in a boiling condition but its concentration is below 70% $H_2SO_4$, and therefore the gas mixture leaving this absorber through the outlet pipe 9 contains only steam and sulfuric acid mist together with the fixed gases. These gases and vapors are passed through a venturi 10, having a restricted throat 11 which causes a high degree of turbulence therein. Water or dilute sulfuric acid is injected into this throat by means of pipe 12 with the result that the greater part of the sulfuric acid mist is condensed and drained through line 13 to a receiving tank 14. The gas mixture is then passed through pipe 15 into a scrubbing tower 16 where it is washed by water sprays 17 and the remainder of the sulfuric acid mist is removed. The uncondensed fixed gases and water vapor leave the system through stack 18, while the scrubbing liquor and dissolved sulfuric acid are passed to receiving tank 14 through pipe 19.

As has been explained, considerably more water is added to the absorbing acid than is ordinarily done in prior systems wherein acid coolers were used. It is a particular advantage of the scrubbing and condensing system shown in the drawing that this water can be first used for removing the sulfuric acid mist from the gases, after which the resulting dilute sulfuric acid is fed into the absorbers. The scrubbing and cooling water is introduced into the tank 14 through line 20, where it mixes with the condensate and wash water entering through lines 13 and 19. The dilute acid is drawn from the tank 14 and forced by pump 21 through line 22 to the connection 23. From this point one portion passes through pipe 24 into sprays 17 while another portion passes through pipe 12 into the throat 11 of the venturi. A third portion of the dilute acid from tank 14 is passed through the valved pipe 25 into the low-stage absorber 1 to be used as make up water for the absorbing and cooling process. Acid from the low-stage absorber 1 is passed through pipe 26 to the high-stage absorber 2, the quantity and strength of this acid being such as to provide (a) an amount of $H_2SO_4$ equal to that removed from this absorber by boiling, (b) sufficient water to react chemically with all of the $SO_3$ absorbed in the high-stage absorber and (c) sufficient additional water to remove the heat generated in the high-stage absorber and the additional sensible heat introduced with the hot $SO_3$ gases, this heat being removed by boiling of the excess water so introduced. A further quantity of dilute acid may also be introduced into the high-stage absorber 2, through the pipe 26, to dilute the product acid to any desired concentration higher than 70% $H_2SO_4$. The product acid obtained in the absorber 2 is drawn off through pipe 27 and may be cooled to storage temperatures in the cooler 28.

As is pointed out above, the high-stage absorber 2 can be eliminated or by-passed when a product acid containing 70% of $H_2SO_4$ or less is desired. In the apparatus shown this can be accomplished simply by opening the valve 29 and closing the valves in the pipes 6 and 7, whereupon the hot sulfur trioxide gases will be introduced directly into the absorber 1. Inasmuch as no sulfuric acid vapors are evolved from a boiling acid containing less than 70% sulfuric acid, only water vapor, fixed gases and sulfuric acid mist will leave the absorber through the outlet pipe 9 and therefore the apparatus will function in the manner described. In this case the high-stage absorber 2 will simply serve as part of the cooling system for the product acid, and can be omitted entirely if desired. Sufficient water or dilute sulfuric acid is admitted through the pipe 25 to maintain the boiling acid in the absorber 1 at the desired concentration.

A single-drum absorber can also be operated to produce sulfuric acid having a concentration greater than 70% $H_2SO_4$ when the venturi 10 is used. By maintaining an aqueous sulfuric acid in the storage and recirculation system 4 having a sulfuric acid content equivalent to that which would ordinarily be maintained in the low-stage absorber 1, if a 2-drum or 3-drum system were used, the venturi can be made to serve the purpose of condensing sulfuric acid vapors boiled from the absorbing acid as well as of condensing the acid mist. For this reason, we regard the combination of a high-stage absorber, in which sulfuric acid having a concentration of from 70% to 98% $H_2SO_4$ is produced by the direct absorption of $SO_3$ gas, with a scrubbing device in which the resulting mixture of acid mist and sulfuric acid-containing vapors is contacted intimately with a more dilute aqueous sulfuric acid, as an important additional feature of our invention.

The drum-type absorbers illustrated in the drawing are both efficient and relatively cheap in construction and maintenance and therefore constitute a preferred form of apparatus for use in practicing the invention. It will be understood, however, that other types of absorbing equipment may be substituted for these drums if desired. Thus, for example, one or more of the packed towers now commonly used for sulfur trioxide absorption and described on pages 457–463 of Fairlie "Sulfuric Acid Manufacture" may be employed.

The invention will be further illustrated by the following specific example, which describes in detail the manufacture of a product acid of 95% strength. It will be understood, however, that sulfuric acid of any desired strength up to that of sulfuric acid monohydrate can be produced by the process of our invention, simply by regulating the quantity of water or dilute acid introduced to the absorbing system through the pipe 25, and therefore this example should be regarded as being given primarily for purposes of illustration only.

EXAMPLE

In a plant producing sulfur dioxide by the combustion of sulfur with air the gases from the converter contained 6.5% of $SO_3$, 11.7% of $O_2$ and 81.7% of $N_2$ by volume. No heat exchanger was used and therefore these gases were passed directly to the absorbing system at 840° F. The volume of gas was 78.5 C. F. M. per daily ton of acid, measured at normal temperature and pressure.

A product acid of 95% $H_2SO_4$ content was desired, and therefore the quantity of water introduced through the pipe 25 was adjusted to maintain an acid of this strength in the high-stage absorber 2. The equilibrium temperature of the boiling acid in this stage was 470° F., in the low-stage absorber 1 the acid concentration was 39.2% $H_2SO_4$ and its equilibrium temperature was 178° F.

Under these conditions the partial pressures of $H_2SO_4$ and $H_2O$ over the boiling acid in the high stage absorber were 20 mm. and 120 mm. of mercury, respectively, and the evaporation rates were 36.4 pounds of $H_2SO_4$ and 40.1 pounds of water per hour. Approximately 2 pounds of sulfuric acid mist per hour were formed. The quanity of make up acid introduced through the pipe 26 was 97.7 pounds per hour and therefore the material and heat balances per hour for each daily ton capacity of sulfuric acid were as follows:

Material balance per daily ton

| Material entering | Lbs./hr. | Material leaving | Lbs./hr. |
|---|---|---|---|
| $SO_3$ gas | 68.4 | Product acid | 87.7 |
| Inert gases | 350.6 | Inert gases | 350.6 |
| Make up acid | 97.7 | $H_2SO_4$ vapor | 36.4 |
|  |  | $H_2O$ vapor | 40.1 |
|  |  | Acid mist | 1.9 |
| Total | 516.7 | Total | 516.7 |

Heat balance at 470° F.

| Heat entering | B.t.u./hr. | Heat leaving | B.t.u./hr. |
|---|---|---|---|
| Sensible heat of gases | 37,800 | Heating make up acid | 20,400 |
| Heat of $SO_3$ absorption | 51,400 | Latent heat of $H_2SO_4$ vapor. | 10,200 |
|  |  | Latent heat of water vapor. | 58,600 |

All of the $H_2SO_4$ evaporated in the high-stage absorber 2 was condensed in the low-stage absorber 1, and only water vapor was boiled from the acid in the low stage. The amount of water removed from the low stage by boiling was 90.5 pounds per hour per daily ton capacity. The make up liquor admitted through the pipe 25 was 111.7 pounds per hour of a dilute acid containing 1.7% $H_2SO_4$ and having a temperature of 152° F. The heat balance on the low-stage absorber was:

Heat balance at 178° F.

| Heat entering | B.t.u./hr. | Heat leaving | B.t.u./hr. |
|---|---|---|---|
| Cooling inert gases from 470° F. | 25,400 | Heating make up liquor from 152° to 178° F. | 2,800 |
| Cooling $H_2SO_4$ and $H_2O$ from 470° F. | 14,800 |  |  |
| Heat of condensation of $H_2SO_4$. | 17,900 | Latent heat of water evaporated. | 98,500 |
| Heat of condensation of water vapor. | 43,200 |  |  |

The equilibrium temperature in the mist eliminating system was 154° F. The gases discharged through the stack 18 contained 86.4 pounds of water vapor per hour and the heat removed as latent heat of vaporization of this water was 86,600 B. t. u. per hour. The quantity of water introduced through the pipe 20 was 105.7 pounds per hour, which consumed 8,050 B. t. u. per hour in raising its temperature to 154° F.

It will be noted that the make up acid to the high-stage absorber through the pipe 26 contained 59.4 pounds of water and 38.3 pounds of $H_2SO_4$ per hour. The quantity of water necessary to form $H_2SO_4$ from the 68.4 pounds of $SO_3$ absorbed was 15.4 pounds, or only 26% of the water introduced, whereas the quantity of water evaporated was 67.5% of the total, while that used to dilute the product acid to 95% strength was about 4 pounds. This is a striking illustration of the way in which an unusually large quantity of heat can be controlled by the process of the invention without the necessity of providing additional cooling apparatus, merely by regulating the amount of water or dilute acid introduced through the pipe 25.

The process of our invention also presents an additional important source of economy in the construction and operation of a contact sulfuric acid plant. The 93% sulfuric acid drying tower and drying acid coolers, which are used to keep the moisture content of the air at a minimum and preferably less than 3 milligrams of water per cubic foot, may be eliminated entirely if desired. The cooling coils for the 93% drying acid are identical in construction with the absorbing acid coolers, described above, but require about 65% more cooling surface since the drying acid is cooled to about 35–40° C. Accordingly, the elimination of the expense of constructing, operating and maintaining this drying and cooling equipment is a very important advantage of the invention.

The purpose of drying the air used for the production of sulfur dioxide gas is to prevent the formation of sulfuric acid mist in the gases leaving the converter. Since a mist elimination system is usually incorporated in the process of the present invention, and since the high temperature absorption process of our invention operates with equal efficiency on mist-free gases and on entering gases containing substantial quantities of sulfuric acid mist, it will be seen that the air-drying system can be entirely eliminated when our new absorbing system is used.

From the foregoing description of our invention, including the specific example, it will therefore be seen that a number of important objects are accomplished. In addition to the provision of a simplified and automatic removal of the heat generated during the sulfur trioxide absorption, the process of our invention also can be operated to remove the excess heat of the sulfur trioxide gases if desired. Because our novel method of absorption will handle $SO_3$ gases containing sulfuric acid mist the presence of such mist in the gases leaving the converter is not a detriment. Accordingly, our invention also permits the elimination of the air-drying system and the 93% sulfuric acid coolers connected therewith in plants using sulfur, hydrogen sulfide, or other sulfur-bearing materials which do not require the use of pre-dried air for other reasons. It will thus be seen that our improved absorption and mist-eliminating process makes possible the construction of a plant consisting simply of a sulfur burner or other sulfur dioxide-producing equipment, a waste heat boiler or other sulfur dioxide cooler if desired, a catalytic converter preferably containing a vanadium type catalyst and one or more absorbers operating on the principles outlined above.

What we claim is:

1. A process of producing sulfuric acid which comprises the steps of (1) maintaining a body of aqueous absorbing sulfuric acid, (2) continuously injecting sulfur trioxide-containing gases below the surface of said acid and thereby causing reaction of said sulfur trioxide therewith to form product acid while simultaneously generating heat of absorption and (3) continuously mixing with said body of acid a quantity of water which is chemically equivalent to said sulfur trioxide plus sufficient to dilute said product acid to a desired value within the range of 70%–98% concentration while (4) retaining within said body of acid sufficient heat of absorption from part of the absorbed sulfur trioxide to maintain it at the boil and boiling said acid by virtue of the heat of absorption of the remainder of said sulfur trioxide and thereby transforming both sulfuric acid and water into vapor, (5) adding to said body of acid an additional quantity of water equal to that removed as vapor and (6) continuously withdrawing product acid from said body of absorbing acid.

2. A method according to claim 1 in which the sulfuric acid vapors are condensed and the recovered sulfuric acid is returned to the body of absorbing acid.

3. A method according to claim 2 in which the sulfuric acid vapors are condensed and the recovered sulfuric acid is returned to the body of absorbing acid.

4. In a process of producing sulfuric acid which comprises the steps of maintaining a body of aqueous absorbing sulfuric acid of from 70% to 98% concentration, continuously mixing water therewith and continuously injecting sulfur trioxide-containing gases below the surface of said body of acid and thereby causing reaction of said sulfur trioxide with the water mixed therewith to form additional sulfuric acid while simultaneously generating heat of absorption, the improvement which consists in retaining within said body of absorbing acid all of the heat of absorption that it is capable of holding while remaining in the liquid state and thereby maintaining said acid at its boiling point while maintaining contact between said boiling acid and additional quantities of said sulfur trioxide-containing gases and thereby generating excess heat by virtue of which a part of the aqueous absorbing acid and a part of the added water are transformed into vapor containing the excess heat as latent heat of vaporization, so proportioning the ratio of water to sulfur trioxide introduced into said body of acid as to provide both the water necessary to react with the sulfur trioxide to form said additional acid and an excess quantity of water corresponding to that removed by boiling, and continuously withdrawing product acid from said body of absorbing acid.

5. In a process of producing sulfuric acid from gases containing sulfur trioxide wherein the sulfur trioxide is absorbed in a liquid body of aqueous sulfuric acid and is reacted with water in situ therein, the new and improved method which comprises passing a stream of the said sulfur trioxide-containing gas into a boiling body of aqueous sulfuric acid of 70%–98% concentration, absorbing the sulfur trioxide from said gas in the boiling body of aqueous sulfuric acid and thereby causing the sulfur trioxide to react with the water therein to form additional sulfuric acid as product acid, the said hot liquid body of aqueous sulfuric acid being simultaneously maintained in an actively boiling condition by the heat developed therein during said absorption and reaction of the sulfur trioxide therein, cooling the vapors evolved from said boiling body of aqueous sulfuric acid and thereby condensing the sulfuric acid contained therein in the form of a dilute aqueous solution of sulfuric acid containing less than 70% $H_2SO_4$, and continuously returning a portion of said dilute sulfuric acid condensate to the boiling body of aqueous sulfuric acid, the portion of dilute acid returned thereto being such as to introduce into the same an amount of water sufficient to provide both the water necessary to react with the sulfur trioxide being absorbed therein and an excess quantity of water sufficient to replace the water being boiled off from the same, and continuously withdrawing product acid from said boiling body of aqueous sulfuric acid.

6. As a new and improved method of producing sulfuric acid from gases containing sulfur trioxide and inert gases wherein the sulfur trioxide is absorbed from said gases in a hot liquid body of sulfuric acid and the sulfur trioxide is reacted with water in situ therein to form additional sulfuric acid as product acid, the improved method which comprises passing a stream of the sulfur trioxide-containing gas into a boiling body of aqueous sulfuric acid containing 70% to 98% $H_2SO_4$, absorbing the sulfur trioxide in said body of aqueous sulfuric acid and reacting the same with the water therein to form additional sulfuric acid as product acid and continuously withdrawing the product acid so formed, the said body of aqueous sulfuric acid being simultaneously boiled by the heat developed therein during said absorption and reaction of sulfur trioxide therein and the heat of formation of said product acid being internally dissipated and removed by distilling sulfuric acid and water from said boiling body of sulfuric acid, condensing the sulfuric acid vapor from the resulting gas mixture by passing the same into a body of sulfuric acid containing less than 70% $H_2SO_4$ and returning a portion of the dilute sulfuric acid so formed to the boiling body of aqueous sulfuric acid in an amount sufficient to provide both the water necessary to react with the sulfur trioxide being absorbed therein and an excess quantity of water sufficient to replace the water being boiled off from the same.

7. A method according to claim 6 in which vapors evolved from the body of sulfuric acid containing less than 70% $H_2SO_4$ are passed through a venturi while simultaneously injecting a recirculating stream of aqueous scrubbing liquid into the throat thereof, thereby agglomerating and condensing sulfuric acid mist from said vapors and recovering its sulfuric acid content in the scrubbing liquid, and a portion of said scrubbing liquid is introduced into said body of sulfuric acid containing less than 70% $H_2SO_4$.

8. In a process of producing sulfuric acid from gases containing sulfur trioxide wherein the sulfur trioxide is absorbed in a hot liquid body of aqueous sulfuric acid and is reacted with water in situ therein, the new and improved method which comprises passing a stream of the sulfur trioxide-containing gas into a first boiling body of aqueous sulfuric acid of 70%-98% concentration, absorbing the sulfur trioxide from said gas in the boiling body of aqueous sulfuric acid and causing the sulfur trioxide to react with the water therein to form additional sulfuric acid as product acid while simultaneously converting about 1% to 5% of said sulfur trioxide into acid mist, the said hot liquid body of aqueous sulfuric acid being maintained in an actively boiling condition by the heat developed therein during said absorption and reaction of sulfur trioxide, contacting the vapors evolved from said first boiling body of sulfuric acid with a second body of boiling aqueous sulfuric acid of less than 70% concentration and thereby condensing the sulfuric acid vapors contained therein while passing the sulfuric acid mist therethrough, agglomerating and condensing the sulfuric acid mist in the resulting gases and returning the resulting condensate to said second body of acid, continuously passing into said first boiling body of sulfuric acid a quantity of more dilute sulfuric acid from said second body of acid such as to provide both the water necessary to react with the sulfur trioxide introduced therein and an excess quantity of water sufficient to replace the water being boiled off therefrom, and continuously withdrawing product acid from said first boiling body of aqueous sulfuric acid.

9. A method of producing sulfuric acid which comprises maintaining a body of aqueous absorbing sulfuric acid of 70% to 98% concentration at its boiling point by retaining therein all of the heat of absorption of a continuously introduced stream of sulfur trioxide gases that it is capable of holding while remaining in the liquid state, injecting said sulfur trioxide gases below the surface of said body of acid and thereby causing reaction of the sulfur trioxide with the water in said acid to form additional sulfuric acid and minor amounts of sulfuric acid mist, said sulfur trioxide gases being injected at a rate sufficient to generate excess heat of absorption by virtue of which a part of the aqueous acid is transformed into vapor containing the excess heat as latent heat of vaporization, agglomerating and condensing the sulfuric acid mist in the gases from the absorption by passing them through a venturi while simultaneously injecting an aqueous scrubbing liquid into the throat thereof and thereby forming a dilute aqueous sulfuric acid, and returning to the absorbing acid a quantity of said dilute acid sufficient to provide both the water necessary to react with the sulfur trioxide absorbed from the gas stream and the water removed from the absorbing acid by boiling.

LOUIS N. ALLEN, Jr.
THOMAS P. FORBATH.

References Cited in the file of this patent
UNITED STATES PATENTS

| Number | Name | Date |
|---|---|---|
| 722,981 | Herreshoff | Mar. 17, 1903 |
| 1,605,004 | Shapleigh | Nov. 2, 1926 |
| 1,777,025 | Allen | Sept. 30, 1930 |
| 2,007,510 | Thornton | July 9, 1935 |
| 2,042,675 | Merriam | June 2, 1936 |
| 2,081,322 | Carney | May 25, 1937 |
| 2,146,792 | Bruckman et al. | Feb. 14, 1939 |
| 2,150,750 | Rogers et al. | Mar. 14, 1939 |
| 2,199,691 | Carter | May 7, 1940 |
| 2,325,566 | Wiley et al. | July 27, 1943 |

OTHER REFERENCES

Miles (The Manufacture of Sulfuric Acid Contact Process), Van Nostrand Co., 1925, pages 286–287.